US010543765B2

(12) United States Patent
Tobata et al.

(10) Patent No.: US 10,543,765 B2
(45) Date of Patent: Jan. 28, 2020

(54) VEHICLE SEAT

(71) Applicant: TACHI-S CO., LTD., Tokyo (JP)

(72) Inventors: Hideo Tobata, Tokyo (JP); Atsushi Koike, Tokyo (JP); Shumpei Toyomi, Tokyo (JP); Atsushi Ishii, Tokyo (JP); Kotaro Kumagai, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 15/768,148

(22) PCT Filed: Sep. 6, 2016

(86) PCT No.: PCT/JP2016/076201
§ 371 (c)(1),
(2) Date: Apr. 13, 2018

(87) PCT Pub. No.: WO2017/064943
PCT Pub. Date: Apr. 20, 2017

(65) Prior Publication Data
US 2018/0304785 A1  Oct. 25, 2018

(30) Foreign Application Priority Data
Oct. 14, 2015 (JP) ................................. 2015-202981

(51) Int. Cl.
*B60N 2/64* (2006.01)
*B60N 2/68* (2006.01)
*A47C 7/02* (2006.01)

(52) U.S. Cl.
CPC .............. *B60N 2/643* (2013.01); *A47C 7/029* (2018.08); *B60N 2/686* (2013.01)

(58) Field of Classification Search
CPC .......... B60N 2/643; B60N 2/686; A47C 7/029
See application file for complete search history.

(56) References Cited

U.S. PATENT DOCUMENTS

| 5,344,211 A * | 9/1994 | Adat ........................ A47C 7/42 297/230.14 |
| 2002/0089219 A1* | 7/2002 | Blanco ................. B60N 2/4221 297/284.4 |

(Continued)

FOREIGN PATENT DOCUMENTS

| CA | 2482446 A1 * | 12/2003 | ............... A47C 7/46 |
| CA | 2491299 A1 * | 6/2006 | ............... B60N 2/80 |

(Continued)

OTHER PUBLICATIONS

International Search Report issued in corresponding International Patent Application No. PCT/JP2016/076201 dated Nov. 15, 2016.

*Primary Examiner* — Timothy J Brindley
(74) *Attorney, Agent, or Firm* — Morgan, Lewis & Bockius LLP

(57) ABSTRACT

The present invention realizes a vehicle seat that allows for smooth movements of the shoulders of a sitter while maintaining a good fit for the sitter. The vehicle seat comprises a back seat having a lower part that supports a lower back area of a sitter, a central part that supports a ribs area, and an upper part that supports a shoulder blades area. The central part has a front surface formed so as to be wider than the lower part and the upper part as viewed from the front side, the front surface being curved with right and left ends thereof being projected forward. The seat back has a notched shape extending from the central part to the upper part such that shoulders of the sitter are exposed as viewed from the rear side.

4 Claims, 10 Drawing Sheets

(56) References Cited

U.S. PATENT DOCUMENTS

| | | | | |
|---|---|---|---|---|
| 2003/0227201 A1* | 12/2003 | Keilhauer | .............. | A47C 7/425 |
| | | | | 297/230.1 |
| 2011/0241403 A1* | 10/2011 | Yamaguchi | .......... | B60N 2/4228 |
| | | | | 297/452.31 |
| 2013/0060282 A1* | 3/2013 | Pham | ..................... | A47C 7/029 |
| | | | | 606/242 |
| 2013/0113264 A1* | 5/2013 | Pham | ..................... | A47C 7/029 |
| | | | | 297/452.21 |
| 2015/0137571 A1* | 5/2015 | Koike | .................... | B60N 2/643 |
| | | | | 297/340 |
| 2015/0165949 A1 | 6/2015 | Tobata et al. | | |
| 2015/0224899 A1* | 8/2015 | Menne, III | ............. | B60N 2/914 |
| | | | | 297/391 |
| 2015/0305961 A1* | 10/2015 | Broerman | ............. | A47C 9/002 |
| | | | | 601/115 |
| 2017/0113584 A1* | 4/2017 | Kumagai | ............. | B60N 2/5825 |
| 2017/0210256 A1* | 7/2017 | Kondrad | ................ | B60N 2/879 |

FOREIGN PATENT DOCUMENTS

| | | | | | |
|---|---|---|---|---|---|
| DE | 102006022150 A1 | * | 11/2007 | ............. | B60N 2/643 |
| EP | 2353928 A1 | | 8/2011 | | |
| FR | 1475850 A | * | 4/1967 | ........... | B60N 2/2218 |
| JP | S51-106422 U | | 8/1976 | | |
| JP | 2015-098213 A | | 5/2015 | | |
| WO | WO-0143685 A1 | * | 6/2001 | ............... | A47C 7/40 |
| WO | WO-2016088508 A1 | * | 6/2016 | ............... | B60N 2/68 |

\* cited by examiner

C-C

B-B

A-A

VEHICLE SEAT

TECHNICAL FIELD

The present application is based on Japanese Patent Application No. 2015-202981 filed on Oct. 14, 2015, the content of which is incorporated herein.

The present invention relates to a vehicle seat.

BACKGROUND ART

A vehicle seat to be installed in a vehicle such as an automobile has a seat cushion (seat part) and a seat back (backrest).

What is considered important about the above-mentioned vehicle seat is to give a sitter a sense of good fit. Under such circumstances, a seat which has been proposed comprises a seat back whose seat surface has a curved shape so as to be bulged along the sitter's shoulder blade in the vertical direction (see Patent Document 1). Since such seat mainly supports the elbow bones area, as well as the shoulder blades area, which have comparatively low variance depending on the difference in physical sizes of sitters, the seat can provide a good fit irrespective of the physical size of the sitter.

CITATION LIST

Patent Document

Patent Document 1: JP2015-098213 A

SUMMARY

Technical Problem

However, when the above-mentioned seat is used, the portion of the seat back which supports the shoulder blades of the sitter bulges in a rightward and leftward direction, the shoulders S of the sitter may be covered and supported by the seat back 100 as shown in, for example, FIG. 10. In such case, when the sitter operates a shift lever or turns his/her upper body in a rightward or leftward direction to check the right, left or rear side of the vehicle, the movement of the sitters shoulders is restricted and it becomes difficult to perform the above operations.

The present application has been made in light of the above circumstances and an object of the present application is to provide a vehicle seat which allows for smooth movements of the sitter's shoulders while maintaining a good fit for the sitter.

Solution to Problem

As a result of intensive studies, the inventors have found that, by forming a central part of a seat back which supports the ribs area of a sitter so as to be wider than an upper part which supports a shoulder blades area and a lower part which supports a lower back area, and forming the back seat so as to have a notched shape extending from the central part to the upper part such that the shoulders of the sitter are exposed as viewed from the rear side, it is possible to allow for smooth movements of the shoulders while maintaining a good fit, and the inventors have thereby achieved the present invention.

Specifically, the present invention includes the following aspects.

(1) A vehicle seat, comprising: a seat back having a lower part that supports a lower back area of a sitter, a central part that supports a ribs area, and an upper part that supports a shoulder blades area, wherein the central part has a front surface formed so as to be wider than the lower part and the upper part as viewed from a front side, the front surface being curved with right and left ends thereof being projected forward, wherein the seat back has a notched shape extending from the central part to the upper part such that shoulders of the sitter are exposed as viewed from a rear side.

(2) The vehicle seat according to (1), wherein the seat back has a curved shape in which a width of the seat back gradually decreases from the central part toward the upper part so as to be narrowed inward, as viewed from the front side (3) The vehicle seat according to (1) or (2), wherein a widest portion in the central part is provided within a range of from 30% to 70% of a length beginning from a border between the seat back and a seat cushion to an upper end of the seat back.

(4) The vehicle seat according to any one of (1) to (3), wherein the upper part is extended upward to a neck area of the sitter.

Advantageous Effects of Invention

According to the present invention, it is possible to provide a vehicle seat which allows for smooth movements of the sitter's shoulders while maintaining a good fit for the sitter.

DESCRIPTION OF EMBODIMENTS

Figure 1:
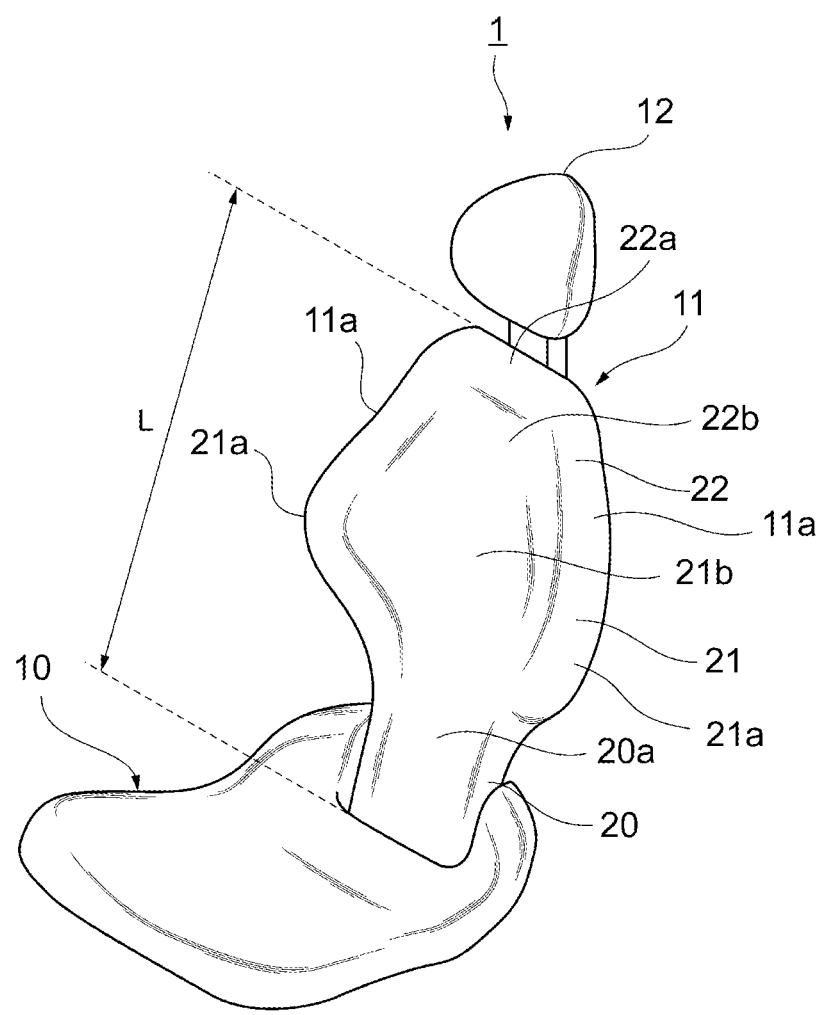
FIG. 1 is a perspective view of a vehicle seat.

The present invention will now be described below more specifically. Although an embodiment will be described below as an example for explaining the present invention, the present invention is not limited to such embodiment. Like reference numerals denote similar components and redundant explanations thereof will be omitted. The positional relationships such as upper, lower, right and left are based on the positional relationships shown in the drawings, unless otherwise indicated. The dimensional ratios in the drawings are not limited to those shown in the drawings.

FIG. 1 is a perspective view showing an example of a vehicle seat 1 according to the present embodiment. The vehicle seat 1 may include, for example, a seat cushion (seat part) 10, a seat back (backrest) 11 and a headrest 12.

The seat back 11 has a wide plate-like shape that is elongated in the vertical direction, the back seat 11 having a lower part 20 for supporting a lower back area H of a sitter P, a central part 21 for supporting a ribs area I and an upper part 22 for supporting a shoulder blades area J. This specification assumes an adult having a typical body length of 150 cm to 185 cm as the "sitter."

Figure 3:
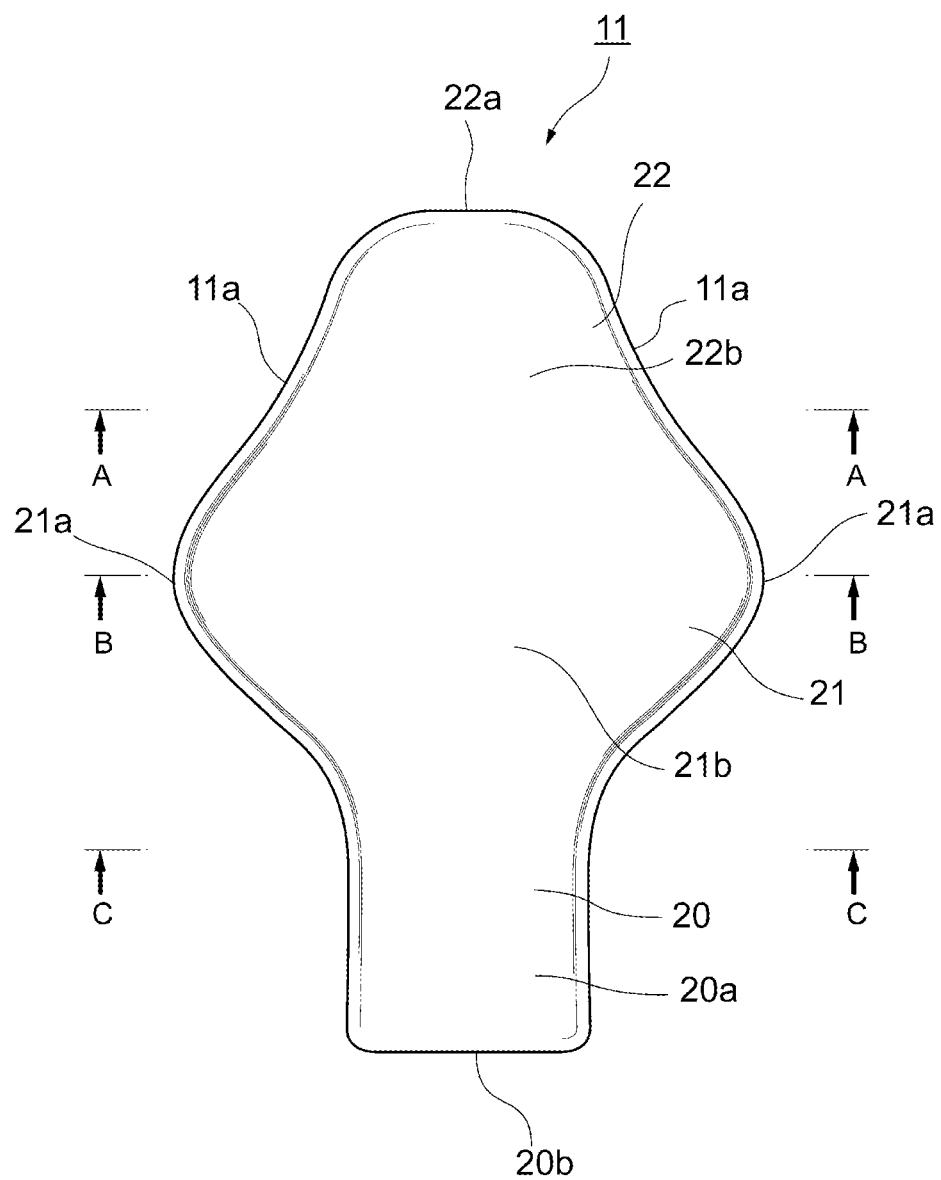
FIG. 3 is a front view of the seat back.
Figure 4:
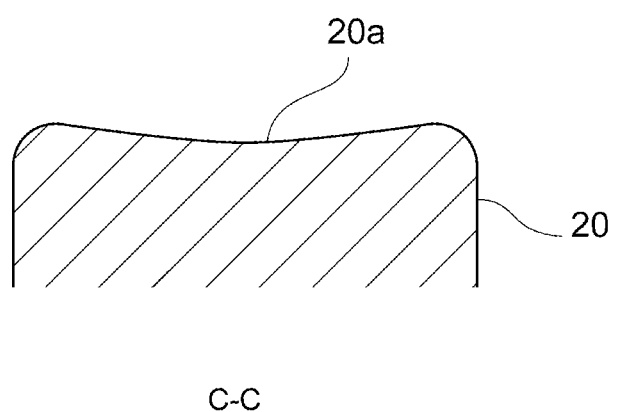
FIG. 4 is an illustration showing the shape of a front surface of a lower part of the seat back in a cross-section taken along line C-C in FIG. 3.

The lower part 20 is relatively thin with an almost constant width as viewed from the front side, as shown in FIG. 3. Specifically, the lower part 20 has a width of 150-300 mm, which is narrower than the width of the lower back H of the sitter P. A front surface 20a of the lower part 20 may be flat in the width direction or slightly curved with the center thereof being recessed, as shown in FIG. 4.

As shown in FIG. 3, the central part 21 is relatively wider than the lower part 20 and the upper part 22 as viewed from the front side. The central part 21 has a curved shape with the width thereof being gradually increased from the lower part 20 and gradually decreased toward the upper part 22. In other words, the central part 21 is formed in a wave-like shape in which the widest portion (a wide portion 21a) as viewed from the front side projects outward. Specifically, the width of the wide portion 21a of the central part 21 is set to about 400-550 mm.

Figure 2:
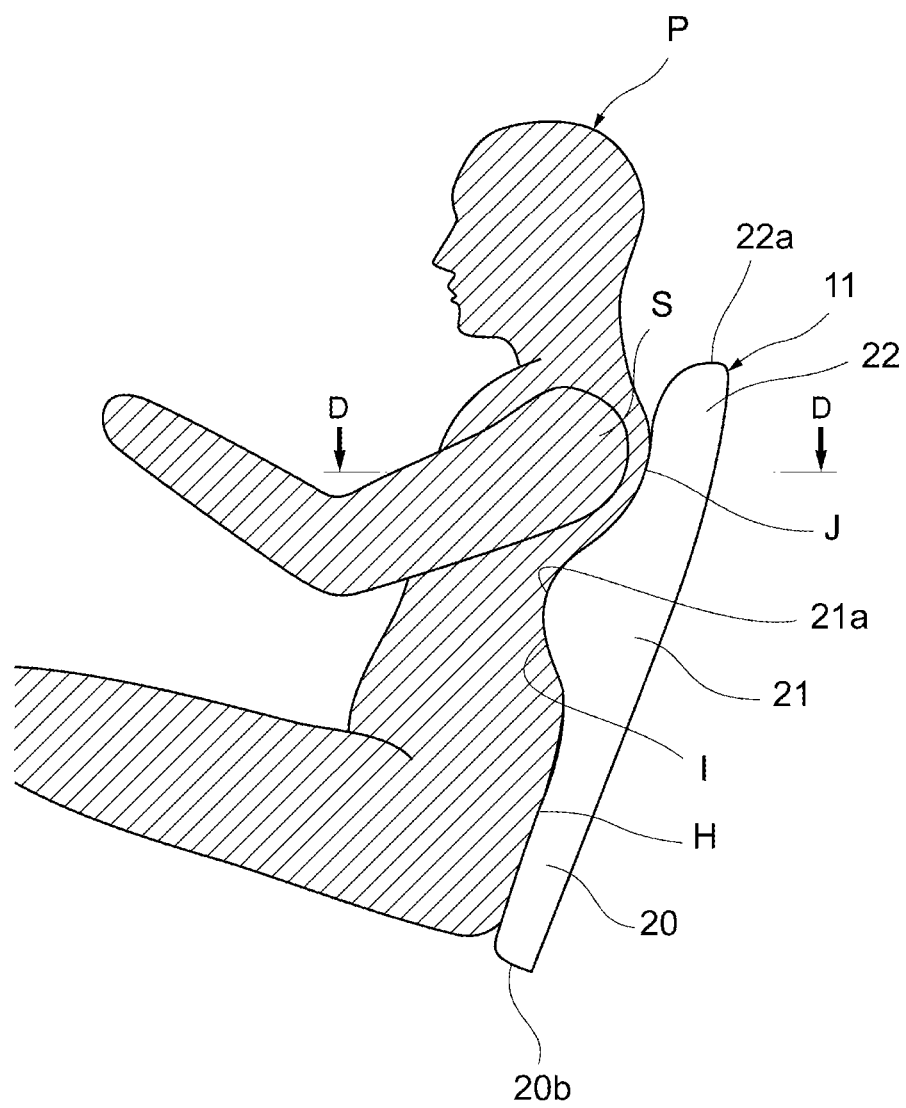
FIG. 2 is a side view showing a seat back with a sitter seated thereon.
Figure 5:
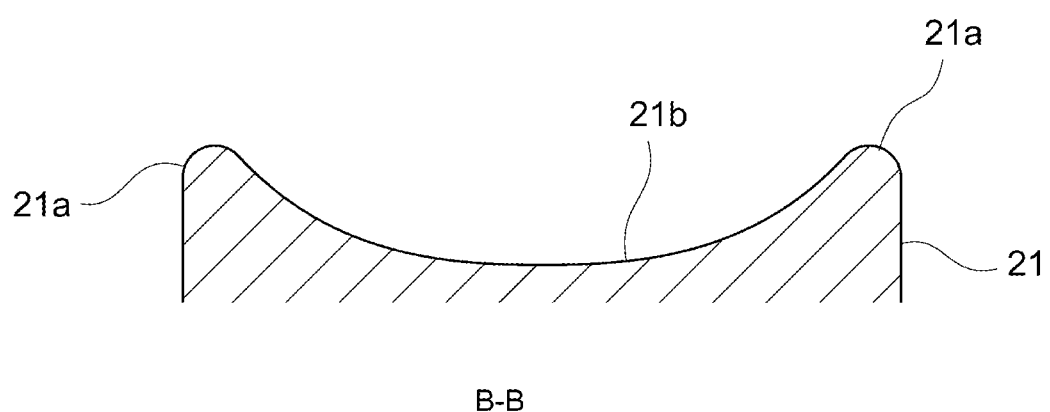
FIG. 5 is an illustration showing the shape of a front surface of a central part of the seat back in a cross-section taken along line B-B in FIG. 3.
Figure 6:
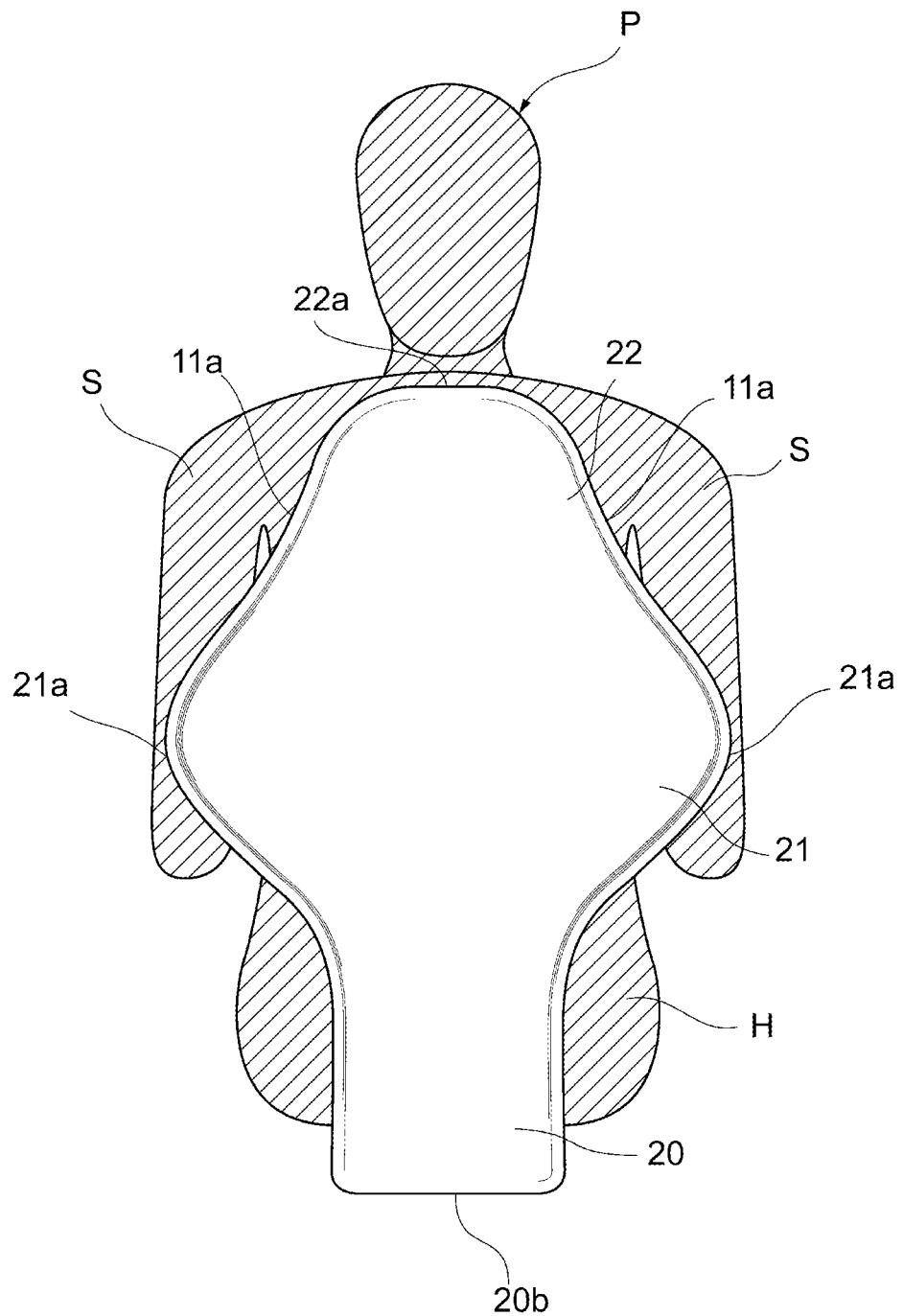
FIG. 6 is a rear view showing the seat back with a sitter seated thereon.

Right and left ends of the central part 21 are projected forward as shown in FIGS. 2 and 5. A front surface 21b of the central part 21 is curved in the width direction such that the center thereof is recessed and the right and left ends are projected forward. With such configuration, the central part 21 can surround and thereby support the ribs area I in the sides of the sitter P.

The seat back 11 has a notched shape 11a in an area extending from the central part 21 toward the upper part 22 such that the shoulders S of the sitter P are exposed as viewed from the rear side, as shown in FIG. 3. For example, the seat back 11 may have a curved shape in which the width thereof gradually decreases from the central part 21 toward the upper part 22 so as to be greatly narrowed inward.

Specifically, the width of an upper end 22a of the upper part 22 may be, for example, about 150-300 mm, which is 30% to 75%, preferably 40% to 60% of the width of the wide portion 21a of the central part 21. The length in the vertical direction of the notched shape 11a (the length from the wide portion 21a of the central part 21 to the upper end 22a of the upper part 22) may be, for example, about 200-300 mm, and the area extending from the wide portion 21a of the central part 21 toward the upper end 22a of the upper part 22 so that the notched shape 11a may be curved so as to be narrowed inward. Further, the wide portion 21a of the central part 21 may be set within a range of from 30% to 70%, preferably from 40% to 60% of a length L (shown in FIG. 1), beginning from the border between the seat back 11 and the seat cushion 10, from the border between the seat back 11 and the seat cushion 10 to the upper end of the seat back 11. It should be noted that the border between the seat back 11 and the seat cushion 10 refers to a border between a seat face (a surface on which the sitter actually sits) of the seat cushion 10 and the seat back 11. The length L from the border between the seat back 11 and the seat cushion 10 to the upper end 22a of the seat back 11 (the length in the vertical direction of an exposed portion of the seat back 11 which is provided above the seat cushion 10, as viewed from the front side) may be, for example, about 600-700 mm. In this way, the seat back 11 is designed so as not to cover at least the shoulder joints of the sitter P.

Figure 7:
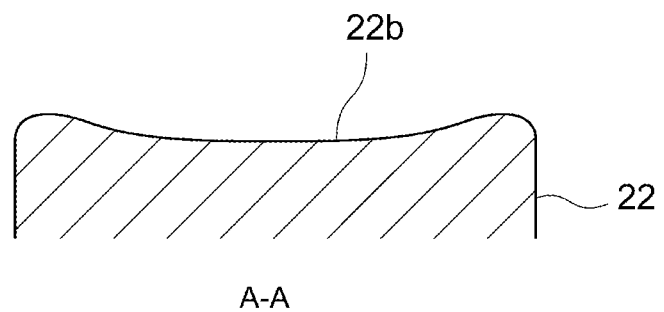
FIG. 7 is an illustration showing the shape of a front surface of an upper part of the seat back in a cross-section taken along line A-A in FIG. 3.

The upper part 22 supports the shoulder blades area J in the upper back of the sitter P. It should be noted that the upper part 22 may not necessarily support the entire shoulder blades area J, but may support only a part of the shoulder blades area J. As shown in FIG. 7, a front surface 22b of the upper part 22 may be flat in the width direction or slightly curved with the center thereof being recessed.

The front surface of the seat back 11, which extends from the central part 21 to the upper part 22, is curved so as to be projected rearward along, for example, the shape of the back of the sitter P.

A material of the seat back 11 may be, for example, urethane, etc.

The seat cushion 10 shown in FIG. 1 is connected to the seat back 11. A material of the seat cushion may be, for example, urethane, etc.

The headrest 12 is connected to the upper end of the seat back 11. A material of the headrest 12 may be, for example, urethane, etc.

Figure 8:
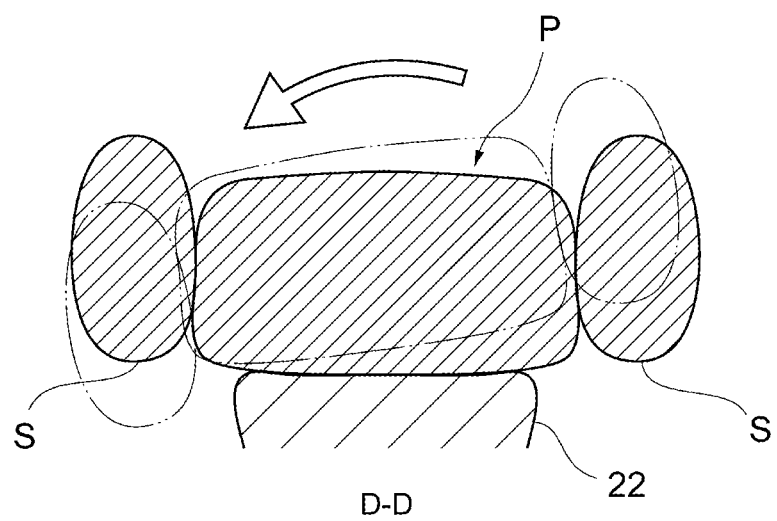
FIG. 8 is an illustration showing movements of the sitter in a cross-section taken along line D-D in FIG. 2.

According to the present embodiment, since the central part 21 of the seat back 11 is formed so as to be wider than the lower part 20 and the upper part 22 and the central part 21 has the front surface 21b which is curved with the right and left ends thereof being projected forward, the sitter P can obtain a good fit regardless of his/her physical size. Further, since the seat back 11 has a notched shape 11a extending from the central part 21 to the upper part 22 such that the shoulders S of the sitter P are exposed as viewed from the rear side, forward and rearward movements of the shoulders S of the sitter P are not restricted as shown in FIG. 8, which allows the sitter P to smoothly perform operations such as the operation of a shift lever and the visual check of the right, left and rear sides of the vehicle, without a feeling of having obstacles. Since the notched shape 11a improves the visibility, if it is employed in a front seat, a rear view and a side view of an occupant of the front seat, as well as a front view of an occupant of a rear seat, become wider.

Since the seat back 11 has a curved shape in which the width thereof gradually decreases from the central part 21 toward the upper part 22 so as to be narrowed inward, the shoulders S of the sitter P can be sufficiently exposed and restrictions to the movements of the shoulders S can be eliminated in an appropriate manner.

Since the wide portion 21a in the central part 21 is provided within a range of from 30% to 70% of the length, beginning from the border between the seat back 11 and the seat cushion 10, from the border between the seat back 11 and the seat cushion 10 to the upper end of the seat back 11, the shoulders S of the sitter P can be sufficiently exposed, and restrictions to the movements of the shoulders S can be eliminated in an appropriate manner.

Although the preferred embodiment of the present invention has been described above with reference to the attached drawings, the present invention is not limited to such example. It is obvious that a person skilled in the art can conceive of various types of changes and modifications within the range of ideas to be set forth in the scope of the claims and it should be understood that such changes and modifications belong to the technical scope of the present invention as a matter of course.

Figure 9:
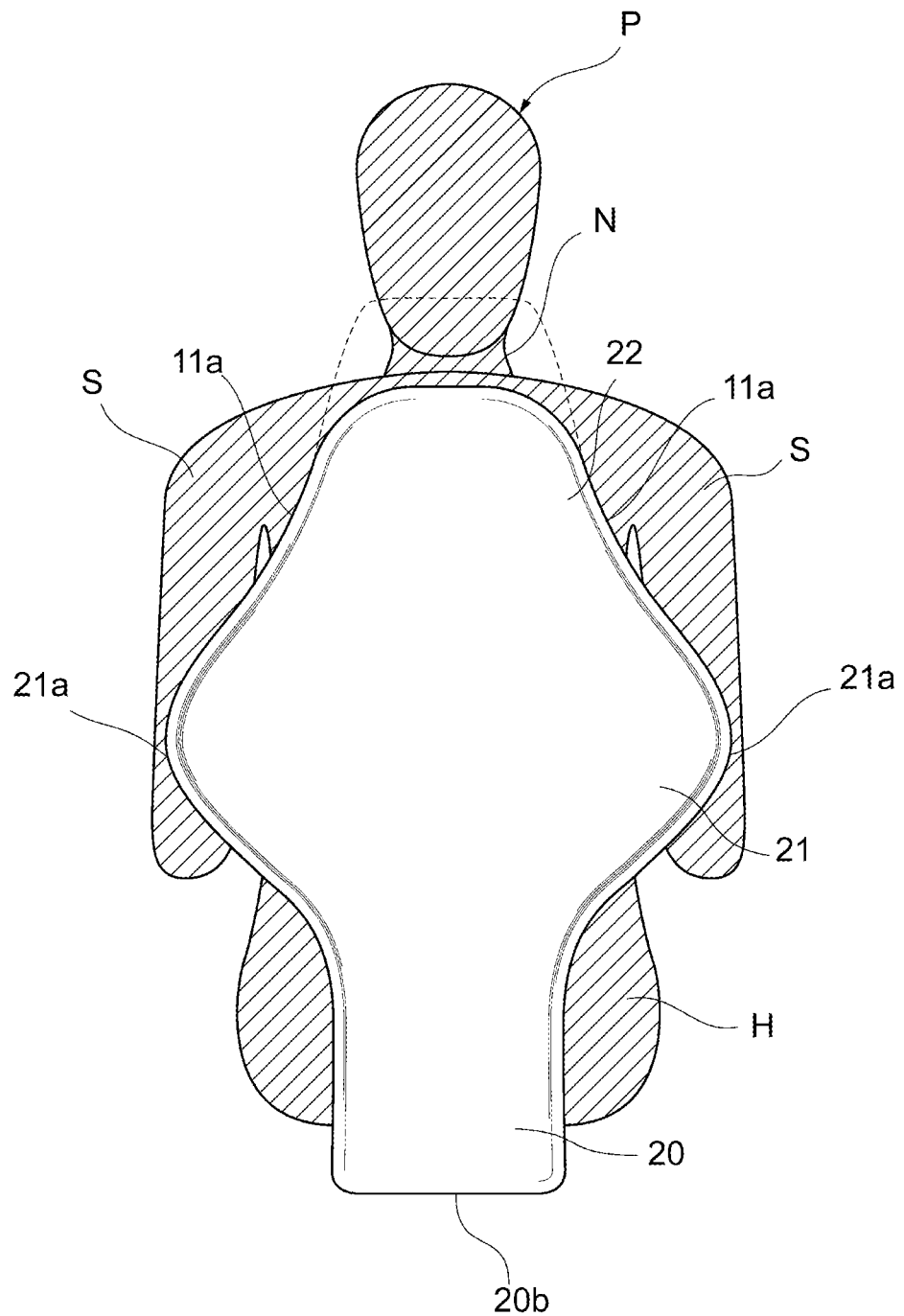
FIG. 9 is a rear view showing a seat back with an upper part thereof extended to a neck of the sitter.
Figure 10:
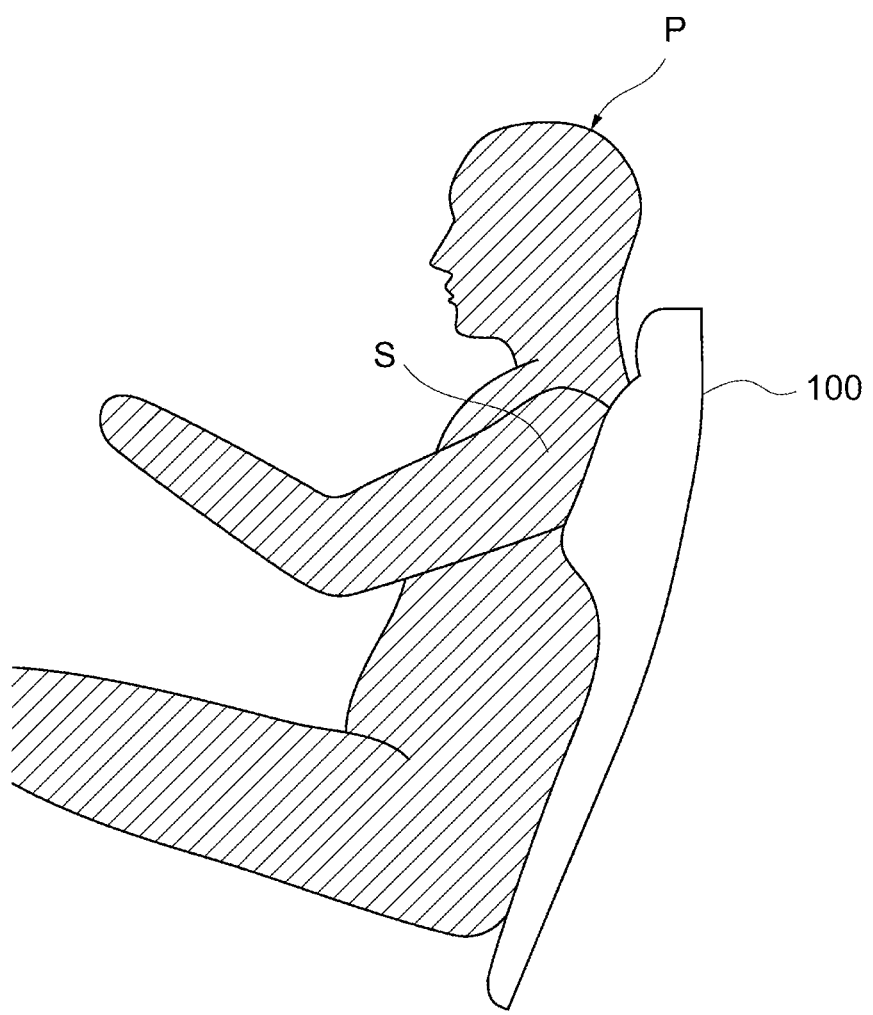
FIG. 10 is a side view showing a related art seat back with a sitter seated thereon.

For example, in the above embodiment, the upper part 22 may be extended upward to around the neck N of the sitter P as shown in FIG. 9. Further, the shapes of the seat cushion 10 and the headrest 12, as well as the connection structure between the seat back 11 and the seat cushion 10 or the headrest 12, are not limited to those of the present embodiment.

INDUSTRIAL APPLICABILITY

The present invention is useful for providing a vehicle seat which allows for smooth movements of the shoulders of a sitter while maintaining a good fit for the sitter.

REFERENCE SIGNS LIST

1: vehicle seat
11: seat back
11*a*: notched shape
20: lower part
21: central part
22: upper part
P: sitter
S: shoulder(s)

What is claimed is:

1. A vehicle seat for accommodating a sitter, comprising:
 a seat back having a lower part that is configured to support a lower back area of the sitter, a central part that is configured to support a ribs area, and an upper part that is configured to support a shoulder blades area,
 wherein the central part is formed so as to be wider than the lower part and the upper part as viewed from a front side, the central part being formed in a wave-like shape so that the widest portion in the central part is at a top of the wave-like shape as viewed from a front side,
 wherein the central part has a front surface formed so as to be curved with right and left ends thereof being projected forward,
 wherein the seat back has a notched shape extending from the central part to the upper part and so dimensioned as to expose shoulders of the sitter as viewed from a rear side,
 wherein the notched shape is a curved shape in which a width of the seat back gradually decreases from the central part toward the upper part so as to be narrowed inward, as viewed from the front side,
 wherein a width of an upper end of the upper part is 40% to 60% of a width of the widest portion in the central part,
 wherein the widest portion in the central part is provided within a range of from 40% to 60% of a length beginning from a border between the seat back and a seat cushion to an upper end of the seat back.

2. The vehicle seat according to claim 1, wherein the upper part is so dimensioned as to extend to a neck area of the sitter.

3. The vehicle seat according to claim 1, wherein the lower part is relatively thin with an almost constant width as viewed from the front side.

4. The vehicle seat according to claim 3, wherein the lower part has a width of 150-300 mm as viewed from the front side.

* * * * *